INVENTOR
JAMES A. MEYER

BY Wheeler, Wheeler, House & Clemency
ATTORNEYS

Oct. 29, 1968   J. A. MEYER   3,407,600
HYDRO-DYNAMIC DRIVE FOR MARINE PROPULSION UNIT
Filed Feb. 17, 1967   2 Sheets-Sheet 2
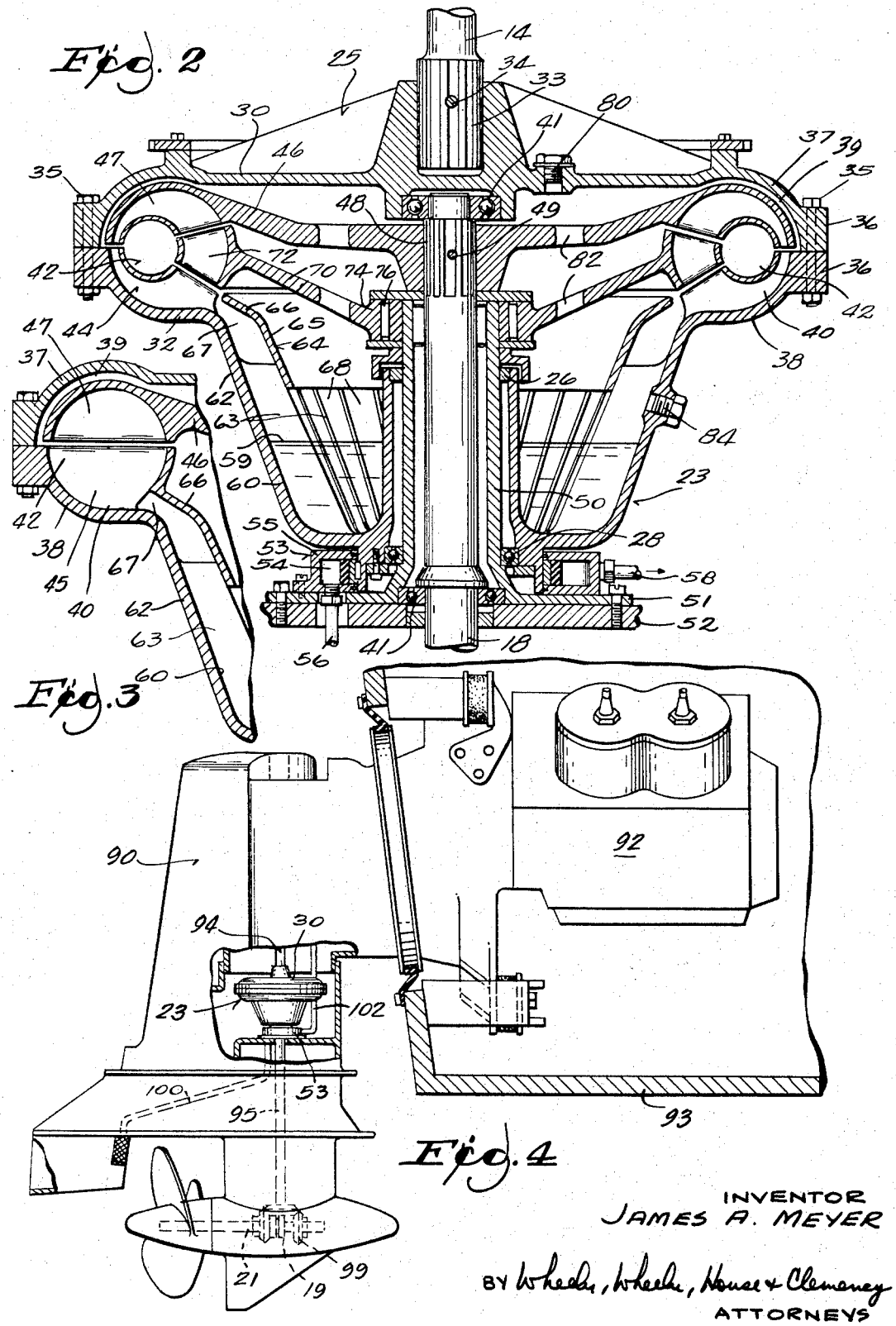
INVENTOR
JAMES A. MEYER
BY Wheeler, Wheeler, House & Clemency
ATTORNEYS 3,407,600
United States Patent Office
Patented Oct. 29, 1968

1

3,407,600
HYDRO-DYNAMIC DRIVE FOR MARINE PROPULSION UNIT
James A. Meyer, Waukegan, Ill., assignor to Outboard Marine Corporation, Waukegan, Ill., a corporation of Delaware
Waukegan, Ill. 60085
Filed Feb. 17, 1967, Ser. No. 616,913
18 Claims. (Cl. 60—54)

ABSTRACT OF THE DISCLOSURE

Disclosed herein is a marine propulsion unit with a hydro-dynamic drive or coupling, connecting a generally vertical and co-axial engine output shaft with a drive shaft. The housing of the hydro-dynamic coupling is fixed to the engine output shaft and rotates therewith. The upper walls of the housing define a torus or working chamber which contains pump, turbine and, in one embodiment, stator elements. The lower housing wall defines a reservoir or sump which is vertically beneath the torus, rotates with the torus, and is in fluid communication with the torus. At low engine speed, gravity drains the oil from the torus and into the sump. With higher engine speed beyond a predetermined range, centrifugal force acting on the oil in the sump causes the oil to travel upward along an inclined wall into the torus, thereby effecting power transfer from the pump to the turbine. Vanes in the sump assist in rotation of the oil contained therein.

Summary of invention

The present invention provides a marine propulsion unit with a hydro-dynamic drive coupling the engine output shaft and a drive shaft, the drive shaft being connected by gears to the propeller shaft. The housing of the hydro-dynamic coupling is secured to the output shaft for cooperative rotation. A torus is formed from semi-toroidal chambers in upper and lower housing sections and contains pump and turbine elements. Beneath the torus is a reservoir or sump in fluid communication with the torus, formed from an inverted frusto-conical wall of the lower housing section. At low engine r.p.m. gravity drains the oil or working fluid from the torus and into the reservoir, providing a torus clear condition in which the hydro-dynamic drive affords no power transfer from the engine output shaft to the drive shaft, and which allows shifting of the gears in the lower unit gear case with minimum wear and without high shock loads on the components associated with the shifting mechanism.

Power transfer through the hydro-dynamic coupling is afforded, upon increase in engine r.p.m. beyond a predetermined range, as the oil stored in the reservoir is centrifugally exhausted from the reservoir and into the torus. Centrifugal flow of the oil upward from the sump to the torus is assisted by vanes in the sump which rotate with the housing and rotate the oil or working fluid. The wall of the reservoir converges upward and outwardly to assist the centrifugal flow of oil into the torus as engine r.p.m. increases.

When the torus is filled with oil, power transfer to the turbine is effected in accordance with conventional fluid coupling operation, with the oil being impelled by the pump vanes against the turbine vanes or blades. In one embodiment of the invention, the torus contains a stator, and the hydro-dynamic coupling functions as a torque converter affording torque multiplication within a predetermined engine r.p.m. range, and when the relative speed of the pump and turbine is at less than a 1:1 ratio. As the turbine speed approaches pump speed no further torque multiplication results and the torque converter functions as a fluid coupling.

Upon decrease in engine speed, the centrifugal force in the torus accordingly decreases, and gravity causes the oil to drain into the sump. At the torus clear point, transmission of torque from engine output shaft to drive shaft ceases and the unit is effectively in neutral.

Use of a torque converter, with torque multiplication within a predetermined low r.p.m. range, permits use of a lower gear ratio in the lower unit gear case and use of smaller gears, whereby a smaller gear case can be used to reduce drag and to improve high speed performance.

Further objects and advantages of the invention will become apparent from the following description and accompanying drawings.

Drawings

FIGURE 2 is an enlarged vertical cross section of one embodiment of the hydro-dynamic drive of the invention.

FIGURE 3 is an enlarged fragmentary vertical section of a further embodiment.

FIGURE 4 is a partially broken away side elevational view of a stern drive marine propulsion unit embodying various of the features of the invention.

Description of preferred embodiment

Figure 1:
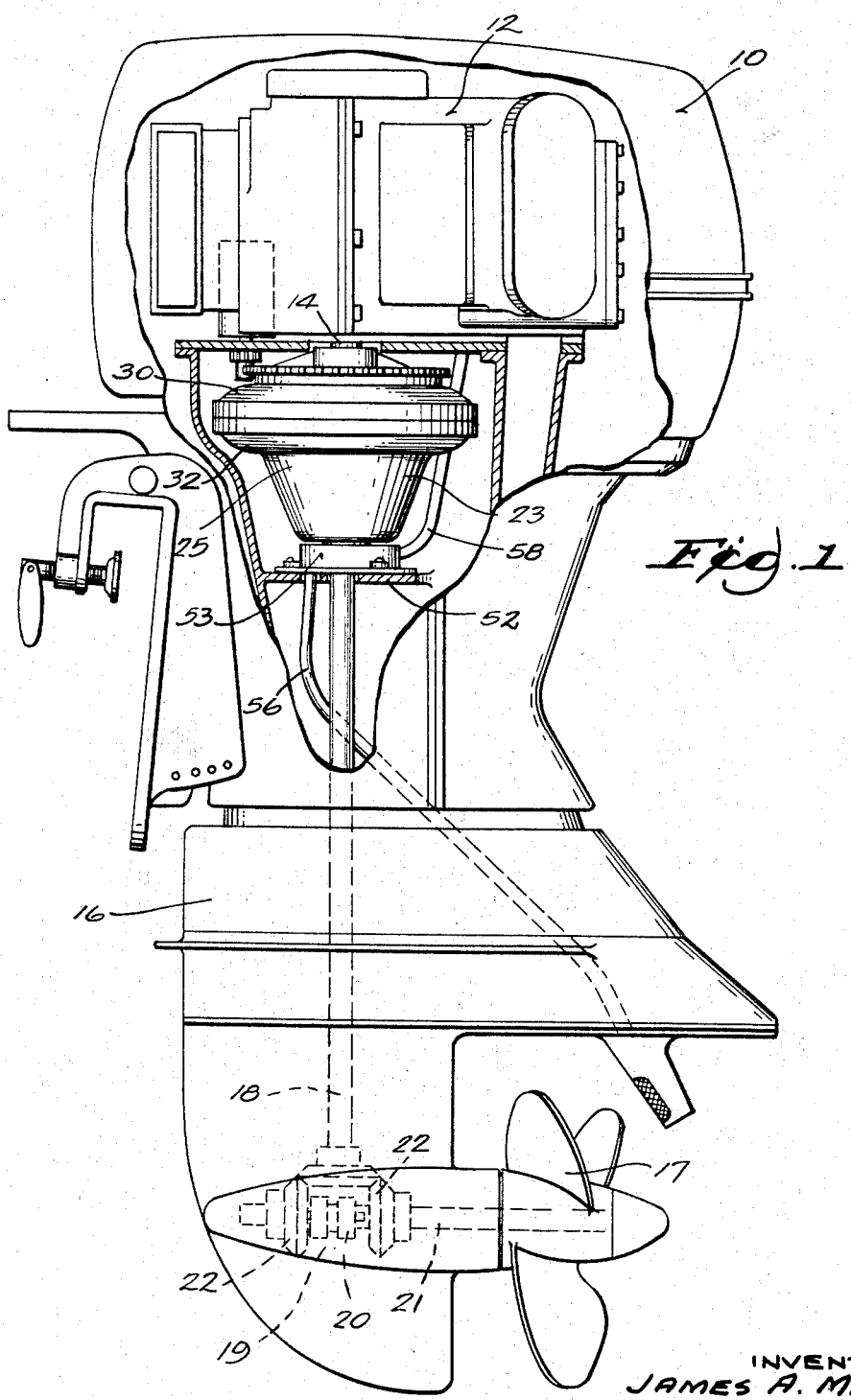
FIGURE 1 is a partially broken away side elevational view of a marine propulsion unit embodying various of the features of the invention.

Referring to the drawings and in particular to FIGURE 1, there is shown an outboard marine propulsion unit or motor which is generally designated 10, and which has a conventional engine or power head 12, with a crank shaft or output shaft 14, and a lower unit 16 through which power is supplied to a propeller 17 by a drive shaft 18, co-axial with the output shaft 14. Forward and reverse propeller rotation is effected by a clutch 19 having a sliding member 20 which is keyed to the propeller shaft 21 and which is selectively axially movable, to engage either of the bevel gears 22 rotatably carried on the propeller shaft 21.

In accordance with the invention, there is provided a hydro-dynamic or hydro-kinetic drive or coupling 23 which is located beneath the engine or power head 12 and which couples the engine output shaft 14 and the drive shaft 18. The hydro-dynamic coupling 23 comprises a housing 25 which is mounted on bearings 26 and 28 (FIG. 2) for rotation relative to the drive shaft 18 and which includes upper and lower housing sections 30 and 32. The output shaft 14 is splined at 33 and pinned at 34 to the housing 25 to provide for rotation of the housing 25 by the output shaft 14. The lower housing section 32 is secured to the upper housing section 30 by a plurality of bolts 35 extending through apertures in outturned flanges 36 of each housing section. Walls 37 and 38 in the upper and lower housing sections 30 and 32 respectively define semi-toroidal chambers 39 and 40 which together form a working chamber or torus 42.

Operating within the torus is a pump 44 comprising vanes 45 within semi-toroidal chamber 40, the pump 44 being in fluid flow relationship to a turbine 46 having vanes 47 within semi-toroidal chamber 39. As shown in FIGURE 2, the turbine is splined at 48 and pinned at 49 to the output shaft 18 which rotates within an upstanding boss 50 having a lower outturned flange 51 secured to frame 52. Drive shaft 18 is rotatably supported in bearings 41.

A water pump 53 is located beneath the hydro-dynamic coupling 23 for supplying cooling water to the engine 12. The water pump 53 has vanes 54 which are secured to the lower housing section 32 and which rotate in a fixed water pump housing 55 mounted to frame 52. The pump 53 has an inlet 56 and outlet 58.

The hydro-dynamic coupling 23 of the present invention affords a neutral or idle condition at low engine r.p.m., as for example 0 to 1,000 r.p.m., thus providing no power transfer from the engine output shaft 14 to the drive shaft 18, and thereby permitting shifting of the gears 22 to effect forward or reverse propeller rotation with a minimum of gear clash and loading on the clutch 19, and components associated with the shifting mechanism. The hydro-dynamic coupling 23 also permits engine starting when the clutch 19 is engaged, thus minimizing overspeed of the engine in neutral, which overspeeding can cause engine damage.

The neutral condition is afforded by an oil circulation system which drains, as by gravity, the working fluid or oil 59 from the working chamber or torus 42 into an oil reservoir or sump 60 located in the lower housing section 32 vertically beneath and co-axial with the torus 42, and in fluid communication therewith. The sump 60 is formed by an inverted frusto-conical or upwardly and outwardly inclined wall 62 of the lower housing section 32.

Power transfer from the engine 12 to the drive shaft 18 is effected upon increase in engine speed beyond the predetermined neutral or idle range, by movement of the oil 59 from the sump 60 and into the torus 42. The oil 50 which is stored in the sump 60 at low engine r.p.m. is centrifugally exhausted or removed from the sump 60 as the housing 25 and oil 59 rotate with the engine output shaft 14.

In accordance with the invention, means are provided in sump 60 for rotating the oil 59 contained therein and for guiding the oil upward and into the torus 42. In the disclosed construction such means comprises radially spaced vanes 63 which are carried on an oil fill director ring 64 and which extend to adjacent the wall 62 of the lower housing section 32. The oil fill director ring 64 has an upper inverted frusto-conical wall 65 with an outturned lip 66 which converges toward wall 62 leaving an annular gap or orifice 67 between the wall 62 and the lip 66 for fluid communication between the sump 60 and torus 42. The oil fill director ring 64 may be cast or molded with the vanes 63 integral with the lower housing section 32 or constructed as a separate unit and secured within housing section 32. Fluid communication with the space between the vanes 63 of the oil fill director ring 64 is afforded by gaps 68 between the vanes 63.

In operation, upon oil flow from the sump 60 and into the torus 42, power transfer from the engine output shaft 14 to the drive shaft 18 occurs as the pump vanes 45 rotate with the housing 25 directing the oil against the vanes 47 of the turbine 46.

Torque multiplication is afforded in one embodiment of the hydro-dynamic coupling of the invention as shown in FIGURE 2 by the use of a stator 70 with blades 72. The stator 70 is mounted on the hub 74 of an overrunning clutch 76 such as a sprag clutch, which clutch 76 is mounted within housing 25 beneath turbine 46 on boss 50.

In the disclosed embodiment, the pump vanes 45 and turbine blades 47, are curved and in toroidal fluid flow relationship with power transmission and torque multiplication afforded in accordance with conventional torque converter operation as described in the texts "Automatic Transmissions," by Purvis, 2nd edition, published by Goodheart-Wilcox, 1956, and "Automotive Transmissions and Power Trains," by Crouse, 2nd edition, published by McGraw-Hill, 1966. As the engine accelerates, the pump vanes 45 rotate at a greater initial speed than the turbine 46 and the drive shaft 18. The curved turbine blades 47 change the direction of oil flow, increase the speed of the oil 59 as it is funneled through exit orifices between the turbine blades and direct the oil against the front face of blades 72 of the stator 70. The impact of the oil 59 leaving the turbine blades locks the stator 70 against its overrunning clutch 76 and holds the stator 70 stationary. The stator blades 72 then redirect the oil into the pump vanes 45 for recirculation into the turbine.

Torque multiplication results as the recirculating oil traveling at higher speed, and thus having greater kinetic energy than the initial oil flow, is again directed into the turbine blades 47. An engine of typical design would provide torque multiplication between 1,000 and 4,000 engine r.p.m., with torque multiplication at the output shaft or drive shaft being approximately 2:1 at 2,500 r.p.m.

As the turbine speed approaches pump speed the angle at which the recirculating oil leaves the turbine correspondingly changes until the oil strikes the rear face of the stator blades 72 causing the stator 70 to free wheel in the direction of rotation of the housing 25 and the turbine 46. The stator 70 then offers no resistance to oil flow from the turbine 46 to the pump. When the stator 70 is free wheeling, for example above 4,000 r.p.m., the hydro-dynamic drive is in the fluid coupling range and transmits torque from the engine to the drive shaft 18 at a 1:1 ratio.

During deceleration, the decrease in centrifugal force in the torus 42 results in gravity flow of the oil 59 from the torus 42 into the sump 60. Accordingly, when the torus 42 is in the torus clear condition, power transfer from engine output shaft 14 to drive shaft 18 ceases and the power train is effectively in neutral permitting shifting from forward to reverse.

Oil can be introduced into the housing 25 and sump 60 through a fill plug 80 in the upper housing section 30 and through apertures 82 in the turbine 46 and stator 70. A drain plug 84 facilitates cleaning and oil removal.

Referring to FIGURE 4, the hydro-dynamic coupling 23 of the present invention is shown in a dirigibly supported marine propulsion unit 90 of a stern drive unit, such as that disclosed in U.S. Patent No. 3,183,880. Power is supplied by an engine 92 within a boat hull 93, the engine 92 being connected to an upper drive shaft 94 which is secured to the upper housing section 30. The turbine is connected to a lower drive shaft 95 which is connected to the propeller shaft 21 by bevel gears 99 which are selectively engaged by a clutch 19. A water pump 53 is similarly located beneath the housing 25 with an inlet tube 100 and outlet tube 102.

Various of the features of the invention are set forth in the following claims.

What is claimed is:

1. A marine propulsion device including an engine having an output shaft, a drive shaft, a housing having relatively fixed upper and lower sections, with said upper section secured to said output shaft for rotation therewith, said housing sections having walls defining a torus, pump means fixed on said housing and located in said torus, turbine means in said torus in fluid flow relation to said pump means, said turbine means being secured to said drive shaft, and a sump in said lower housing section, said sump being in fluid communication with said torus, said sump being adapted to retain fluid within a pre-determined low engine speed range and centrifugally exhaust fluid from said sump and into said torus above said predetermined speed range to afford power transfer from said pump means to said turbine means.

2. A marine propulsion device in accordance with claim 1 wherein said output shaft and said drive shaft are coaxial and generally vertical.

3. A marine propulsion device in accordance with claim 1 wherein said sump is formed from the outer wall of said lower housing section.

4. A marine propulsion device in accordance with claim 1 including means in said sump for rotating fluid contained therein and guiding fluid flow from said sump into said torus.

5. A marine propulsion device in accordance with claim 4 wherein said means in said sump for rotating fluid and for guiding fluid flow from said sump into said torus comprises, in said lower housing section, an upwardly and outwardly inclined outer wall, and spaced vanes rotating with said lower housing section.

6. A marine propulsion device in accordance with claim 5 including an oil director ring having an upper wall with an outturned lip providing an annular gap between said torus and said sump for fluid communication between said sump and said torus.

7. A marine propulsion device in accordance with claim 5 wherein said vanes extend to said upwardly and outwardly inclined outer wall of said lower housing section and are integral therewith.

8. A marine propulsion device in accordance with claim 5 wherein said oil director ring includes means defining gaps communicating with the space between said vanes for fluid communication therebetween.

9. A marine propulsion device in accordance with claim 1 including a stator within said torus, said stator being rotatable in one direction about an axis co-axial with said drive shaft, said stator having blades co-operating with said turbine means to direct fluid leaving said turbine means into said pump means for re-circulation into said turbine means and thereby afford torque multiplication within a pre-determined engine speed range.

10. In a hydro-dynamic drive having a housing with walls defining a torus, pump means fixed on said housing in said torus, turbine means situated in said torus in fluid flow relation to said pump means, an input shaft connected to said housing for rotation of said housing, and an output shaft secured to said turbine means and journaled in bearings mounted on said housing for rotation relative to said housing, the improvement in combination therewith comprising a fluid sump in said housing vertically beneath said torus, and in fluid communication with said torus and rotatable with said torus, said sump being adapted to retain fluid and including means for centrifugally exhausting fluid from said sump and into said torus above a pre-determined speed range to provide for power transfer from said pump means to said turbine means.

11. A hydro-dynamic drive in accordance with claim 10 wherein said sump is defined by an outer wall of said housing.

12. A hydro-dynamic drive in accordance with claim 10 including means in said sump for rotating fluid contained in said sump and for guiding the flow of fluid from said sump into said torus.

13. A hydro-dynamic drive in accordance with claim 12 wherein said means in said sump for rotating fluid and for guiding fluid flow from said sump into said torus comprises an upwardly and outwardly inclined outer wall, an oil director ring, and spaced vanes rotating with said lower housing section.

14. A hydro-dynamic drive in accordance with claim 13 wherein said oil director ring has an upper wall with an outturned lip providing an annular gap between said torus and said sump for fluid communication therebetween.

15. A hydro-dynamic drive in accordance with claim 13 wherein said oil director ring includes means defining gaps communicating with the space between said vanes for fluid communication therebetween.

16. A hydro-dynamic drive in accordance with claim 13 including a stator within said torus, said stator being rotatable in one direction about an axis co-axial with said drive shaft, said stator having blades co-operating with said turbine means to direct fluid leaving said turbine means into said pump means for re-circulation into said turbine means and thereby afford torque multiplication within a pre-determined engine speed range.

17. A stern drive marine propulsion device including upper and lower co-axial drive shafts, a frame supporting said upper and lower drive shafts and adapted for connection to a boat hull, a hydro-dynamic drive coupling said upper and lower drive shafts, said hydro-dynamic drive having a housing secured to said upper drive shaft and including upper housing walls defining a torus, and lower housing wall portions defining a sump in fluid communication with said torus and adapted for retaining fluid within a pre-determined low engine speed range and for centrifugally exhausting fluid from said sump into said torus above said pre-determined engine speed range, and turbine means in said housing and secured to said lower drive shaft to afford power transfer from said upper drive shaft to said lower drive shaft during the presence of fluid in said torus.

18. A marine propulsion device in accordance with claim 1 including a water pump located beneath said housing, said water pump having vanes secured to the lower housing section and rotatable therewith, and within a fixed water pump housing.

References Cited

UNITED STATES PATENTS

| | | | |
|---|---|---|---|
| 2,088,818 | 8/1937 | Skinner | 60—54 |
| 2,473,809 | 6/1949 | Miller | 60—54 |
| 2,672,115 | 3/1954 | Conover | 115—17 |
| 2,755,764 | 7/1956 | Alexander | 115—17 |

EDGAR W. GEOGHEGAN, *Primary Examiner.*